United States Patent
Norimatsu (10) Patent No.: US 6,344,821 B2
(45) Date of Patent: Feb. 5, 2002

(54) MOBILE COMMUNICATION SYSTEM AND INTER-BASES STATION SYNCHRONZING METHOD

(75) Inventor: Hidehiko Norimatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/740,978

(22) Filed: Dec. 21, 2000

(30) Foreign Application Priority Data

Dec. 22, 1999 (JP) .......................................... 11-363686

(51) Int. Cl.$^7$ ................................................. G01S 1/24
(52) U.S. Cl. ...................................... 342/387; 370/324
(58) Field of Search ................................. 342/367, 386, 342/387, 463; 455/456, 561; 370/320, 324, 342

(56) References Cited

U.S. PATENT DOCUMENTS 5,640,679 A * 6/1997 Lundqvist et al. ......... 455/33.2
6,219,347 B1 * 4/2001 Uchida et al. ............... 370/347
6,230,018 B1 * 5/2001 Watters et al. .............. 455/456

* cited by examiner

Primary Examiner—Dao Phan
(74) Attorney, Agent, or Firm—Foley & Lardner

(57) ABSTRACT

A plurality of base stations each calculate a distance function value with respect to a mobile station by detecting up signal therefrom in their own receiver (step S15), and transmit the calculated value to a base station controller (step S16). When a base station as reference base station receives, from the mobile station, the difference of timings of base station down signal reception (steps S17 and S18), it transmits the reception timing difference to the controller (step S19). The controller calculates, from data from an in-question base station, the difference of up signal reception timings in the reference and in-question base stations, and reports the difference to other base stations than the reference base station, thus causing down signal transmission timing updating.

11 Claims, 5 Drawing Sheets

MOBILE COMMUNICATION SYSTEM AND INTER-BASES STATION SYNCHRONZING METHOD

BACKGROUND OF THE INVENTION

This application claims benefit of Japanese Patent Application No. 11-363686 filed on Dec. 22, 1999, the contents of which are incorporated by the reference.

The present invention relates to mobile communication systems and simplified inter-base station synchronizing methods used for the same and, more particularly, to an inter-base station synchronizing method in cellular communication adopting CDMA (Code Division Multiple Access) system.

In cellular communication adopting CDMA system, usually a technique of frequency and timing synchronization of base and mobile stations is important for maintaining a constant communication quality. For example, in the case of adopting IS-95, which is adopted in North America, inter-base station synchronization is obtained by using GPS (Global Positioning System) at chip clock level. In this case, once a mobile station establishes timing synchronization with a base station, it can relatively readily establish timing synchronization with a different base station by using the established timing, although the readiness vary with signal propagation channels.

In the meantime, in W-CDMA (Wide band-CDMA) system which is a positively promising third-generation digital cellular system for future adoption, inter-base station synchronization at chip clock level is not guaranteed. In this system, the mobile station should therefore repeatedly perform the same procedure as initial synchronization capturing process to obtain timing synchronization with a different base station. That is, the system poses in such case a problem that a certain time is necessary until the synchronization capturing.

Another technical feature of the cellular communication adopting the CDMA system is diversity hand-over. In diversity hand-over technique, down signals from different base station or different sectors, irrespective of the same base station, are transmitted with the same data provided therein, and a mobile station simultaneously receives and combines such down signals. This technique can improve the signal transmission quality. Another advantage of the technique is that radio transmission without momentary interruption is possible during movement of the mobile station from an area covered by one base station or sector to another.

However, since the W-CDMA system does not guarantee the inter-base station synchronization at chip clock level as noted above, the mobile station can not directly efficiently receive and combine signals. Some measure, therefore, is necessary to solve this problem.

By way of example, ARIB (Association of Radio Industries and Businesses) provides prescriptions, which have not yet been standardized, propose the following procedure in "Specification of Air-Interface for 3G Mobile System Volume 3 (Ver 1.0)".

In "3.2.6.6.1. Diversity Hand-over (intra/inter-cell)" in "3.2.6.6 Hand-over", a mobile station measures the timing difference between communicating cell and hand-over destination perch channel, and reports the measured timing difference to BSC (Base Station Controller) via base station. The BSC controls the down transmission timing of the hand-over destination base station according to the notified difference to be substantially the same as such hand-over destination timing in the mobile station.

In the prior art W-CDMA system as described above, the mobile station should take the above ARIB prescription procedure for efficient signal reception and combination. Such procedure, although necessary for synchronization among out-of-synchronization base stations, is disadvantageous because of the facts that it is intrinsically unnecessary so long as down signal timing synchronization prevails and that it increases unnecessary signaling.

SUMMARY OF THE INVENTION

An object of the present invention, therefore, is to provide a mobile communication system and a simplified inter-base station synchronizing method used for the same, which can solve the problems discussed above, and permits search time reduction and suppression of unnecessary signaling at hand-over occasions.

According to an aspect of the present invention, there is provided a mobile communication system comprising a plurality of base stations asynchronous to one another, a controller for controlling each of the plurality of base stations and a mobile station for receiving down signals from and transmitting up signals to the plurality of base stations; the mobile station having a means for detecting the difference of timings of reception of down signals from the plurality of base stations, and a means for transmitting the detected reception timing difference to a reference base station; the plurality of base stations each having a means for determining a own distance function with respect to the mobile station by detecting a time interval from the timing of down signal transmission till the timing of up signal reception in the mobile station, a means for transmitting the determined own distance function to the controller, and a means for transmitting the detected reception timing difference from the mobile station to the controller upon reception of a report from the controller that the own base station is the reference base station; the controller having a means for calculating the difference of timings of down signal transmission from the reference and other base stations on the basis of the distance functions thereof and the detected reception timing difference form the mobile station, and a means for transmitting the calculated transmission timing difference to the other in-question base station, thus causing down signal transmission timing updating.

The mobile station transmits the up signal a predetermined period of time after the pertinent down signal reception timing. The plurality of base stations each determine the own distance function in a statistical process with values received from the mobile station in a predetermined constant period of time. The plurality of base stations each determine the own distance function in a statistical process with values received from a plurality of mobile stations. The plurality of base stations each cause the down signal transmission timing updating within a timing holding capacity of the mobile station.

According to another aspect of the present invention, there is provided a simplified inter-base station synchronizing methods used for a mobile communication system which comprises a plurality of base stations asynchronous to one another, a controller for controlling each of the plurality of base stations and a mobile station for receiving down signals from and transmitting up signals to the plurality of base stations; wherein the mobile station includes a step for detecting the difference of timings of reception of down signals from the plurality of base stations, and a step for transmitting the detected reception timing difference to a reference base station; the plurality of base stations each includes a step for determining a own distance function with respect to the mobile station by detecting a time interval from the timing of down signal transmission till the timing of up signal reception in the mobile station, a step for transmitting the determined own distance function to the controller, and a step for transmitting the detected reception timing difference from the mobile station to the controller upon reception of a report from the controller that the own base station is the reference base station; and the controller includes a step for calculating the difference of timings of down signal transmission from the reference and other base stations on the basis of the distance functions thereof and the detected reception timing difference form the mobile station, and a step for transmitting the calculated transmission timing difference to the other in-question base station, thus causing down signal transmission timing updating.

The mobile station transmits the up signal a predetermined period of time after the pertinent down signal reception timing. The the plurality of base stations each determine the own distance function in a statistical process with values received from the mobile station in a predetermined constant period of time. The plurality of base stations each determine the own distance function in a statistical process with values received from a plurality of mobile stations. The plurality of base stations each cause the down signal transmission timing updating within a timing holding capacity of the mobile station.

According to other aspect of the present invention, there is provided a mobile communication system in which each of the plurality of base stations asynchronous to one another and a mobile station are controlled for receiving down signals from and transmitting up signals to the plurality of base stations by a controller, wherein the mobile station is adapted to detect the difference of timings of reception of down signals from a reference base station and an other in-question base station among the plurality of base stations and transmit the detected reception timing difference to the reference base station, the plurality of base stations are each adapted to determine a own distance function with respect to the mobile station by detecting a time interval from the timing of down signal transmission from the mobile station till the timing of up signal reception in the mobile station, transmit the determined own distance function to the controller and transmit the detected timing difference from the mobile station to the controller upon reception of a report from the controller that the own base station is the reference base station, and the controller is adapted to calculate the difference of timings of down signal transmission from the reference and other base stations from the distance functions thereof and the detected reception timing difference from the mobile station and transmit the calculated transmission timing difference to the other base station for updating the down signal transmission.

More specifically, the simplified inter-base station synchronizing method according to the present invention is one, which permits easily obtaining synchronization among out-of-synchronization W-CDMA system base stations. As a method of determining inter-base station timing error, is assumed a procedure such as ARIB procedure mentioned in "3.2.6.1. Diversity Hand-over (intra/inter-cell)" in "Specifications of Air-Interface for 3G Mobile System Volume 3 (Ver 1.0)".

This procedure permits the BSC to measure inter-base station chip timing error in each mobile station as reported from each mobile station. This measurement, however, involves errors due to the distance between the mobile and base stations, due to signal propagation channel status, for instance environmental error introduced when the measurement is executed in a multiple pass status, due to accuracy of measurement in the mobile station and so forth. Therefore, the measured error can not be directly dealt with as inter-base station error.

It is conceivable to use, for canceling error due to distance, values which can be measured in the base station. The mobile station is adapted to transmit up signal after a delay time of, for instance, one half slot from the down signal reception for satisfying a certain time relation between up and down signal timings at all times. This means that the error between the actual reception timing and rated signal reception timing (reception timing to be received) of the base station concerning the signal transmitted from the mobile station, is thought to correspond to double the distance between the base and mobile stations. Thus, by measuring the error and reporting the measured error to the BSC at an adequate cycle interval, the BSC can cancel the effects of the error by calculation.

Other errors may be corrected in statistical processes with values obtained by distance cancellation, and it is possible to obtain probable values to certain extents. The timings of the base stations under control by the BSC, thus can be readily synchronized by causing gradual base station down signal timing updating.

While heretofore very long search time was required with asynchronous base stations, by readily taking inter-base station synchronization using inter-base station timing difference measurements obtained by mobile station, it is possible to reduce search time and also reduce inter-base station signaling. That is, once inter-base station synchronization is established to a certain extent, the mobile station can search a new base station in a reduced search time, and also it is possible to preclude unnecessary signaling in hand-over occasions.

Other objects and features will be clarified from the following description with reference to attached drawings.

PREFERRED EMBODIMENTS OF THE INVENTION

Preferred embodiments of the present invention will now be described with reference to the drawings.

Figure 1:
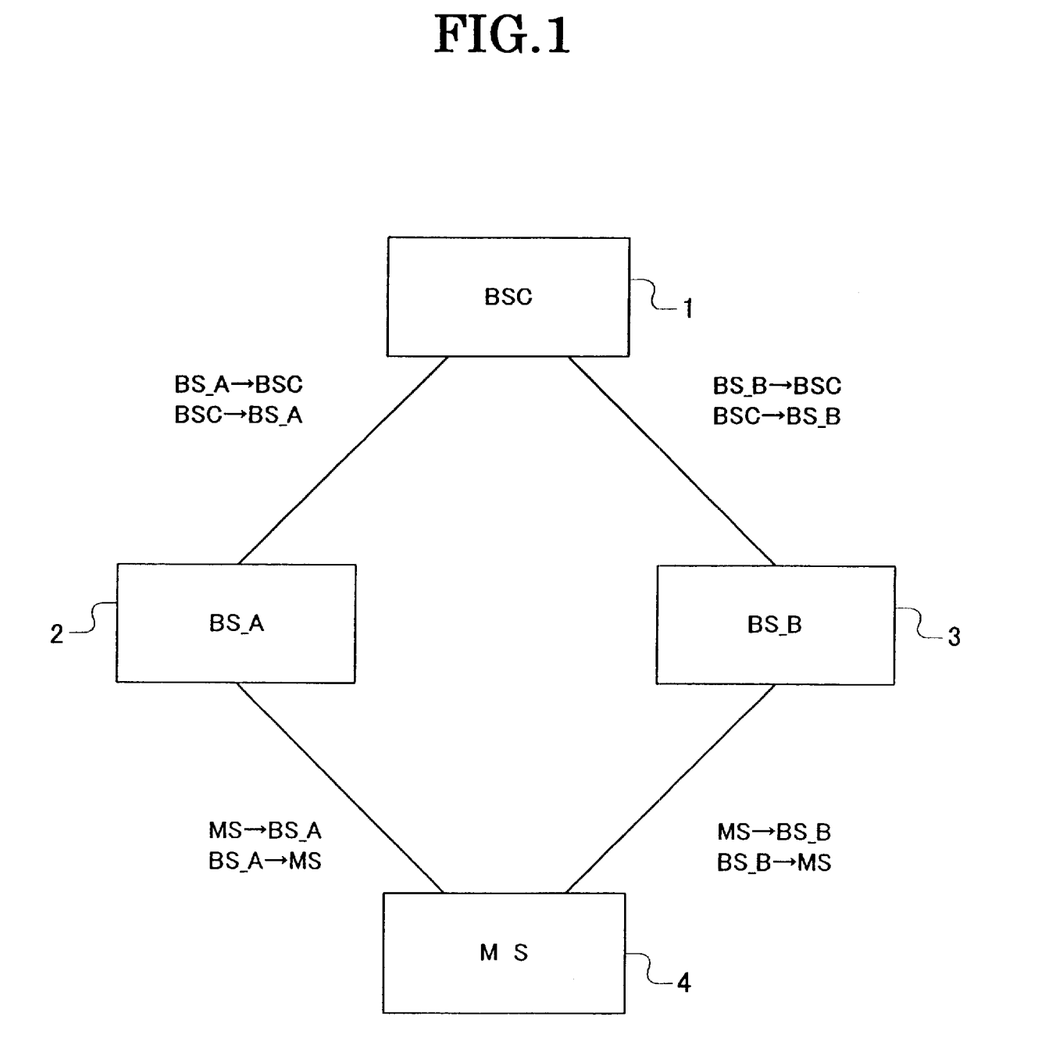
FIG. 1 is a block diagram showing the constitution of mobile communication system embodying the present invention.

An embodiment of the present invention will now be described with reference to the drawings. FIG. 1 is a block diagram showing the constitution of mobile communication system embodying the present invention. Referring to the Figure, the embodiment is illustrated in terms of timing relationship between each of a plurality of base stations, i.e., base stations (BS_A, BS_B) 2 and 3, and a mobile station (MS) 4 and also signaling among the base stations 2 and 3, mobile stations 4 and base station controller (BSC) 1.

Usually, the base stations 2 and 3 are connected by wire to the base station controller 1 and by radio to the mobile station 4. In the illustration, the base stations 2 and 3 are in or going to be in a hand-over situation to each other with respect to the mobile station 4.

Figure 2:
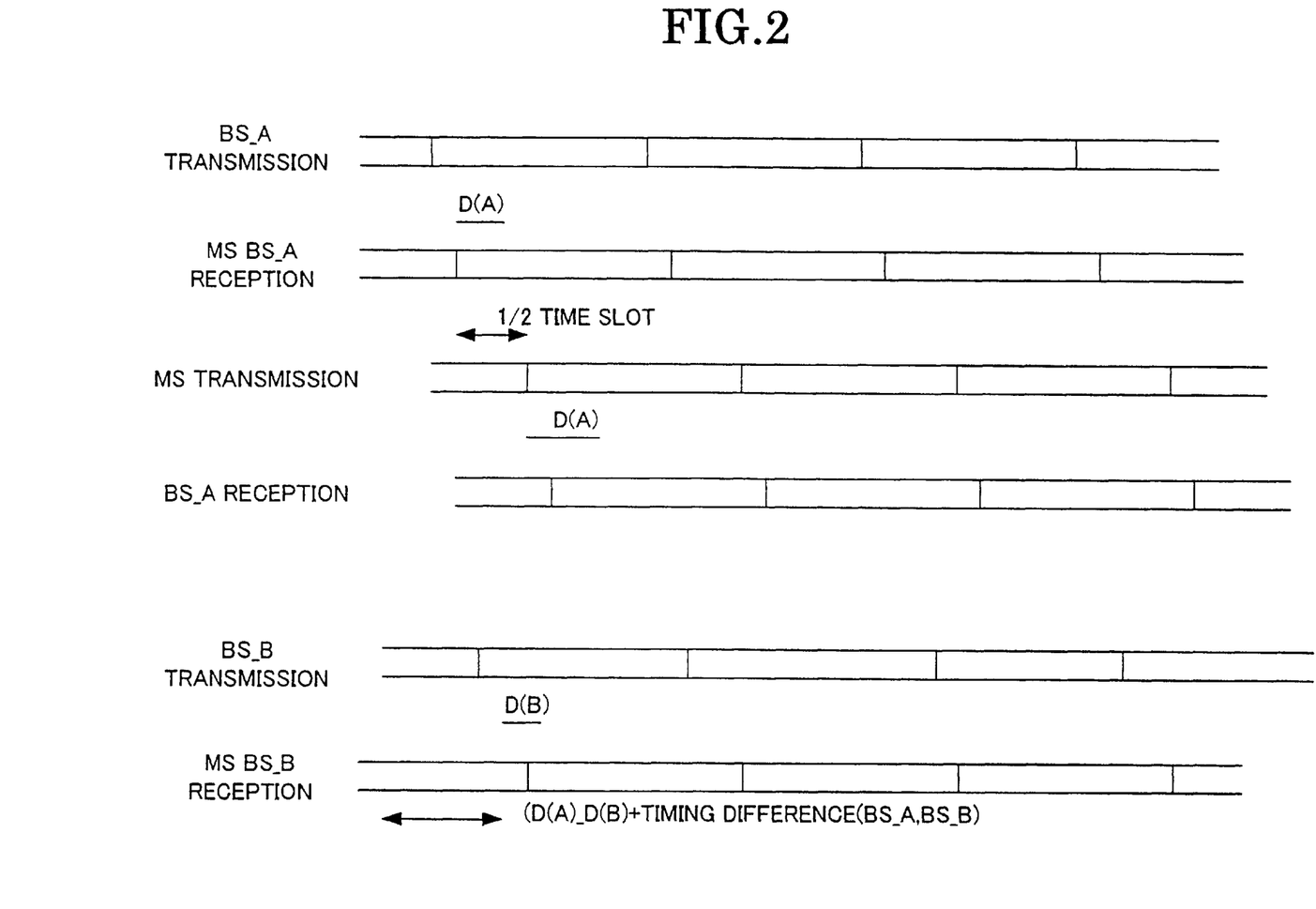
FIG. 2 is a timing chart showing transmission/reception timings between each of the base stations 2 and 3 and the mobile station 4 in FIG. 1.
Figure 3:
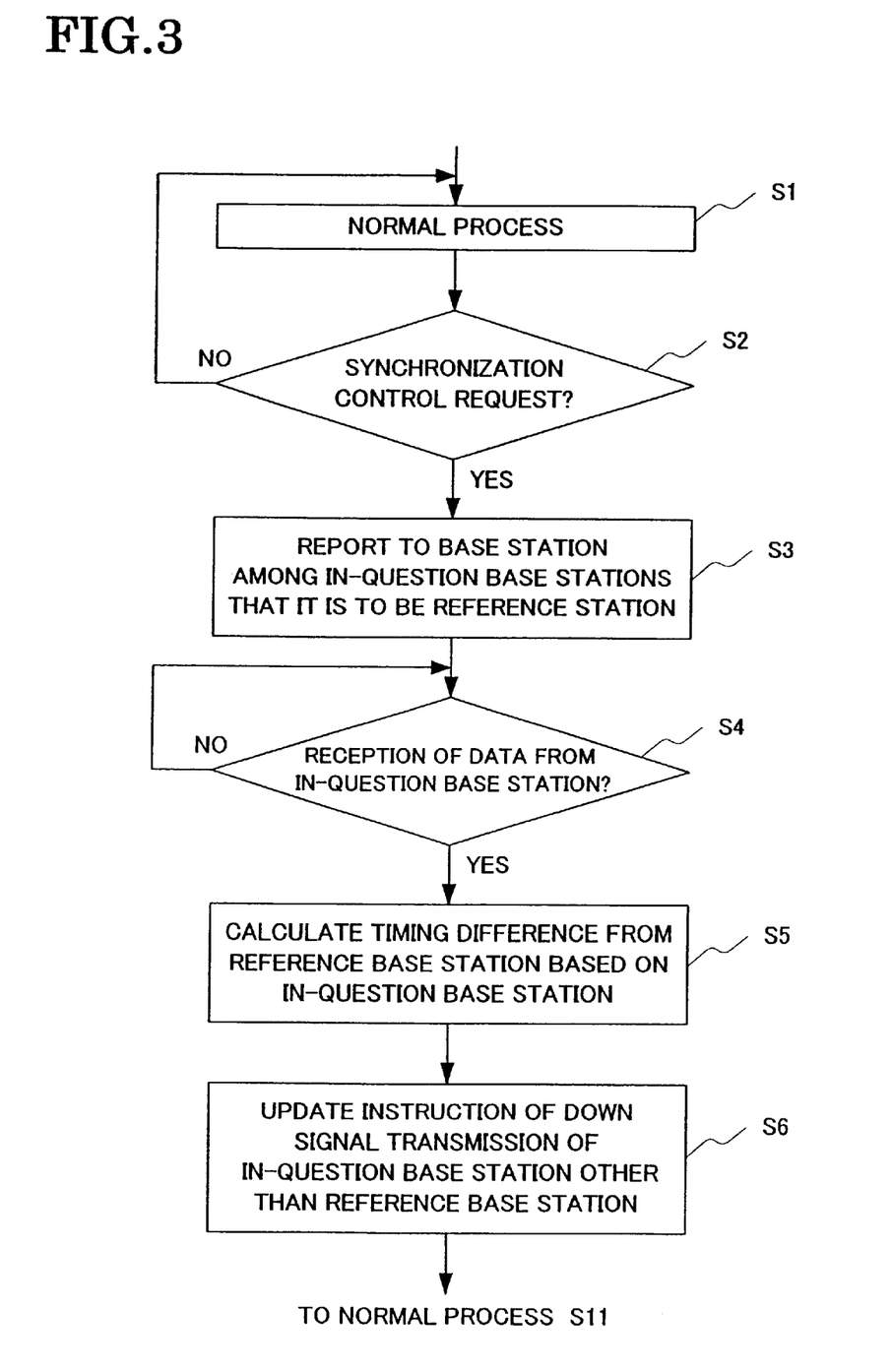
FIGS. 3 to 5 are flow charts illustrating process operations of the base station controller 1, each of the base stations 2 and 3 and the mobile station 4 shown in FIG. 1, respectively.
Figure 4:
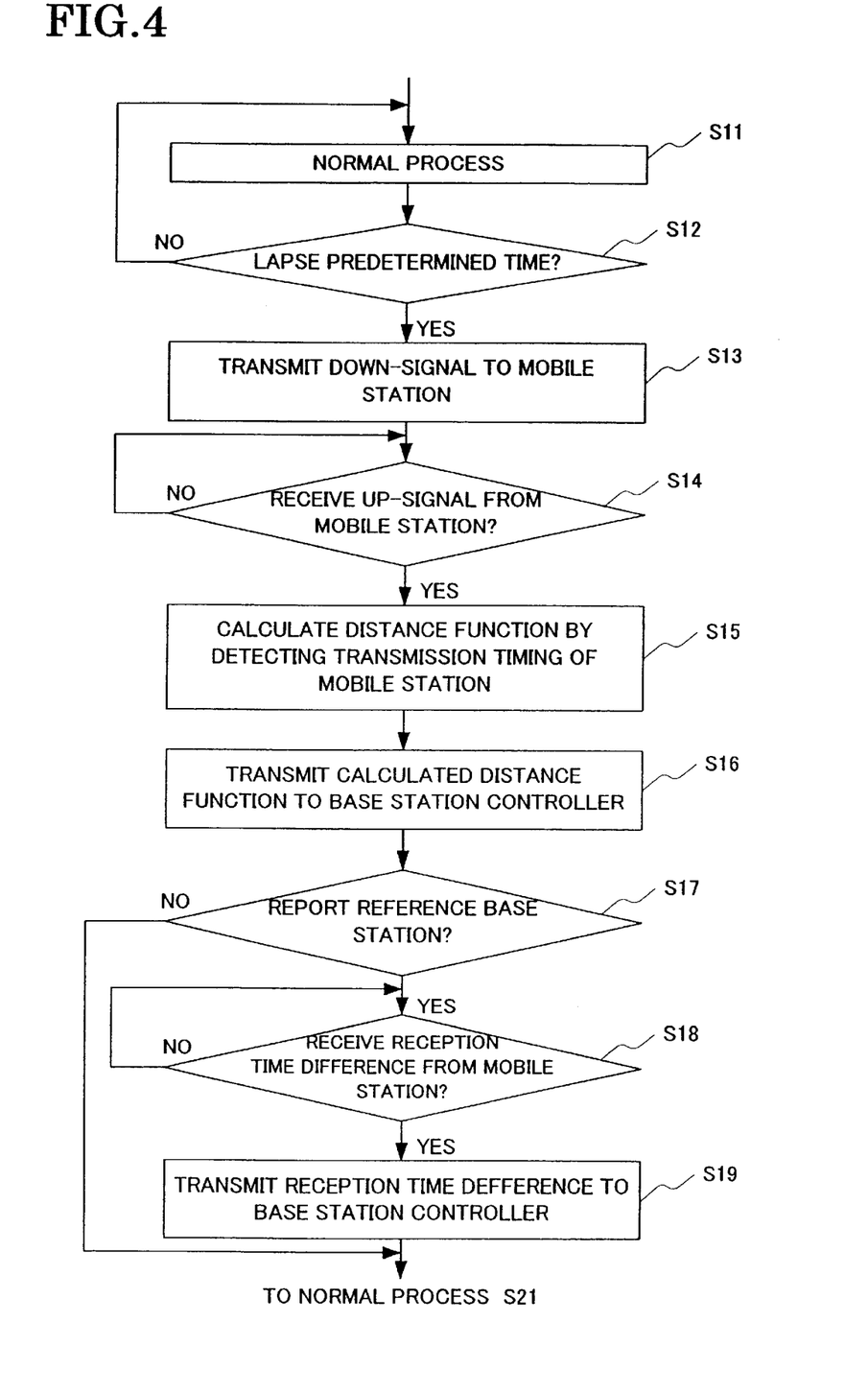
Figure 5:
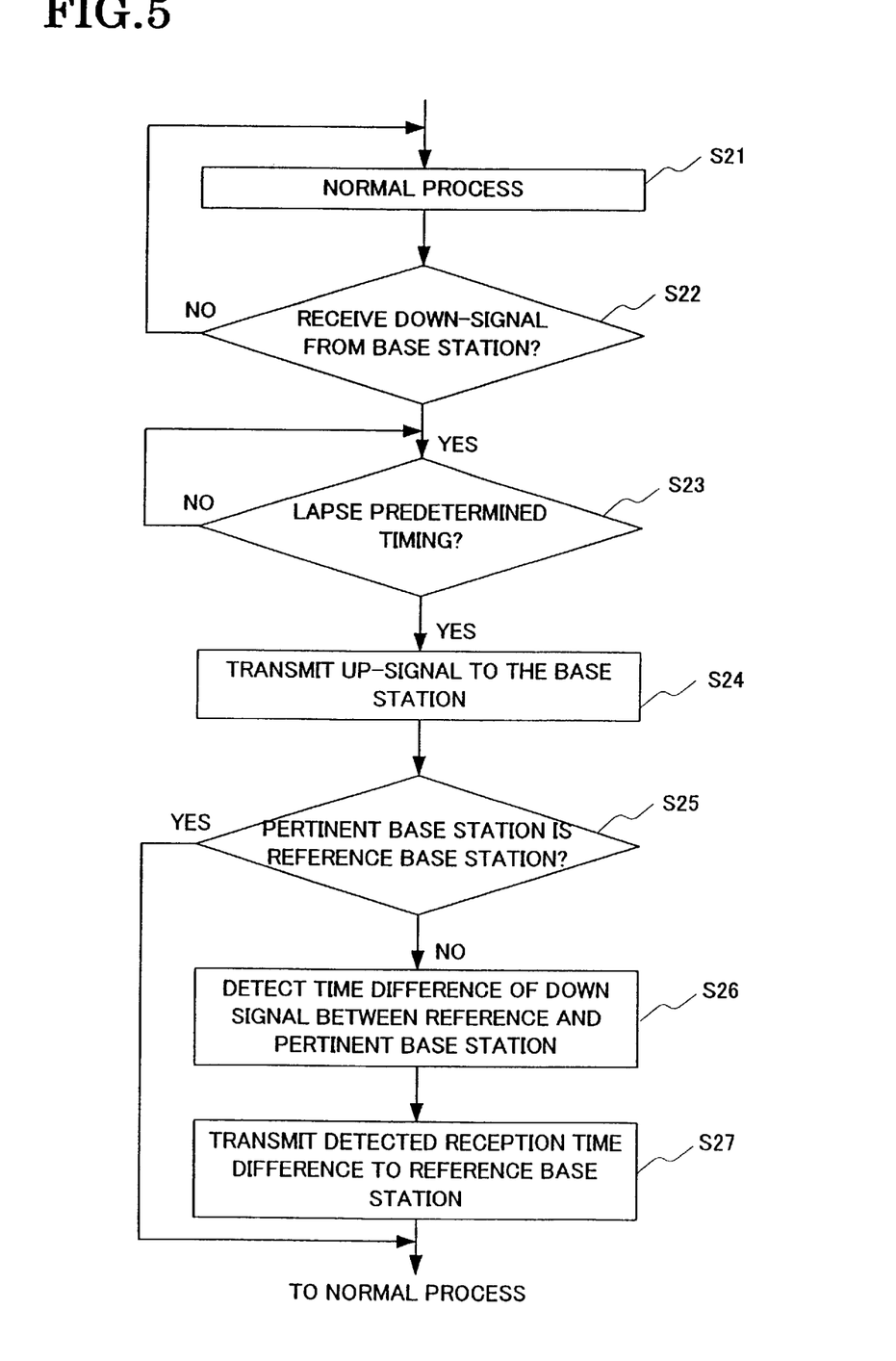

FIG. 2 is a timing chart showing transmission/reception timings between each of the base stations 2 and 3 and the mobile station 4. FIGS. 3 to 5 are flow charts illustrating process operations of the base station controller 1, each of the base stations 2 and 3 and the mobile station 4 shown in FIG. 1, respectively.

A method of simplified synchronization of the base stations 2 and 3 to each other in the embodiment of mobile communication system according to the present invention will now be described with reference to FIGS. 1 to 5. Here unit time sections are referred to as slots. The process operations shown in FIGS. 3 to 5 are executed according to control memory programs (not shown) provided in the base station controller 1, the base stations 2 and 3 and the mobile station 4, respectively. As control memory may be used ROM (read only memory), IC (integrated circuit), etc.

During normal processing, the base stations 2 and 3 transmit their down signals to the mobile station 4 at predetermined time intervals (steps S11 to S13 in FIG. 4). The mobile station 4 receives the down signal from the base station 2 at a timing, which is delayed by a certain period of time after the timing of down signal transmission from the base station 2. This delay time is a function of distance, and it is thus shown as D(A).

When the mobile station 4 receives the down signal from the base station 2 during normal processing (steps S21 to S23 in FIG. 5), it transmits up signal to the base station 2 at a timing, which is delayed by a predetermined period of time, for instance one half the slot, after the down signal reception timing (step S24 in FIG. 5).

The base station 2 receives the up signal from the mobile station 4 at a timing delayed by D(A) (step S14 in FIG. 4). Described so far is the timing relationship between the base and mobile stations 2 and 4 during communication.

It is now assumed that the base station 3 is transmitting its down signal at a different timing from the base station 2, and is going to be in new communication with the mobile station 4. The mobile station 4 receives the down signal from the base station 3, D(B) after the down signal transmission from the base station 3. D(B) is related to the distance between the base and mobile stations 3 and 4.

The mobile station 4 has been reported from the base station 2 that the base station 2 is a reference base station. By receiving the down signals from the base stations 2 and 3 (steps S22 to S25 in FIG. 5), the mobile station 4 detects the difference between the timings of reception of the down signals from the base stations 2 and 3 (step S26 in FIG. 5).

It will be seen that the difference between D(A) and D(B) is equal to the difference between the timings of reception of the down signals from the base stations 2 and 3. The mobile station 4 reports the difference by signaling denoted by notation MS→BS_A to the base station 2 as reference base station (step S27 in FIG. 5).

The base stations 2 and 3 can determine the values of D(A) and D(B), respectively, by detecting the up signals from the mobile station 4 in their own receivers (step S15 in FIG. 4). In this embodiment, the values of D(A) and D(B) are each calculated by subtracting ½ time slot (i.e., delay time until up signal transmission from the mobile station 4) from the difference between the down signal transmission and up signal reception timings in each of the base stations 2 and 3 and dividing each difference into one half.

The base stations 2 and 3 each transmit each of the values of D(A) and D(B) by signaling of each of notations BS_A→BSC and BS_B→BSC to the base station controller 1 (step S16 in FIG. 4). The base station 2 is reported from the controller 1 that it is the reference base station (step S17 in FIG. 4), and when it receives from the mobile station 4 the difference of the down signal reception timings in the base stations 2 and 3 (step S18 in FIG. 4), it reports the reception timing difference by signaling of notation BS_A→BSC to the controller 1 (step S19 in FIG. 4).

When the base station controller 1 receives synchronization control requests from the base stations 2 and 3 (steps S1 and S2 in FIG. 3), it reports to the base station 2 among the base stations 2 and 3 as in-question base stations that the base station 2 is to be the reference base station (step S3 in FIG. 3).

When the base station controller 1 receives data as noted above from the in-question base stations 2 and 3 (step S4 in FIG. 3), it calculates the difference of the transmission timings of the base stations 2 and 3 as reference and in-question base stations, respectively, on the basis of data from the base stations 2 and 3 which are now in-question base stations (step S5 in FIG. 3).

The data from the in-question base stations 2 and 3 are measurement values transmitted via unstable radio channels and are not truly correct due to propagation influence and influence of accuracy of reception in the mobile station 4. Thus, the mobile station 4 performs a statistical process of, for instance, averaging values received in a predetermined period of time for true error estimation, and transmits the estimated error to the base station 3 for down signal transmission timing updating (step S6 in FIG. 3). The down signal transmission timings of the base stations 2 and 3 thus can be readily updated to proper timings.

The statistical process yields the higher probability the more samples are obtained for it. Better results are thus obtainable by performing the process with values from a plurality of mobile stations. Actually, mobile stations are operating in fading environments in the presence of a plurality of multi-passes, and the reception timing is based on the first arrived pass or pass having the maximum correlation as its reference. Estimation accuracy thus can be improved by using data from a plurality of mobile stations The system desirably adopts a standard method of mobile station reception timing estimation.

As for the down signal transmission timing updating, by suddenly updating the timing to a great extent mobile stations in communication may get out of timing. Therefore, the cycle and extent of updating should be taken into careful considerations. The mobile station usually can establish communication during its travel, and thus it can maintain timing in multi-pass fading environments. The updating is preferably executed within the timing maintaining capacity of the mobile station.

While the above embodiment was described under an assumption that the mobile station receives signal via a single channel, it is obviously possible that the same effects are obtainable in the same procedure in the case of a traffic channel and a synchronizing channel are present as separate physical channels such that inter-channel timing off-set is present between these channels.

Furthermore, timings once set up are subject to deviation with the lapse of time because of inter-base station frequency deviation. However, it is possible to maintain simplified synchronization at all times by repeatedly executing the procedure described above in an appropriate cycle.

With the inter-base station synchronization substantially maintained in the above procedure, the mobile station can reduce time for the timing setting when searching a new base station. Thus, the search time can be reduced, and the redundant time thus obtained may be used for extending the communication or waiting time by power saving or for a separate process. Also, the search time reduction permits more suitable design for providing more compact system.

Still further, it is possible to provide such an arrangement that the down signal transmission timing difference between the base stations 2 and 3 is within a predetermined period of time, the mobile station 4 can attain hand-over without any signaling of reporting such difference. This permits reducing signaling in the network.

Yet further, while the above embodiment concerned with the timings of the base and mobile stations 2 to 4 under control of the base station controller 1, the present invention is actually applicable to upper rank system operations as well. It is thus possible to attain hand-over of the base station controller 1 to another one by a similar synchronization method.

Further, while in the exemplified method the distance measurement was executed in the base stations 2 and 3, if a means for detecting position data of itself is mounted in it, the mobile station 4 can estimate the timing difference between the base stations 2 and 3 from such position data.

Moreover, since it is exchanging signals with base stations during its travel as well, if a means for measuring speed from the Doppler effect with changes in its distance from a base station is mounted in it, the mobile station can accurately measure the down signal transmission timings of two in-question ones of a plurality of base stations by transmitting measured speed data to the reference base station.

As has been described in the foregoing, in the mobile communication system according to the present invention, which comprises a plurality of base stations asynchronous to one another, a controller for controlling each of the plurality of base stations and a mobile station for receiving down signals from and transmitting up signals to the plurality of base stations, the mobile station is adapted to detect the difference of timings of reception of down signals from a reference base station and an other in-question base station among the plurality of base stations and transmit the detected reception timing difference to the reference base station, the plurality of base stations are each adapted to determine a own distance function with respect to the mobile station by detecting a time interval from the timing of down signal transmission from the mobile station till the timing of up signal reception in the mobile station, transmit the determined own distance function to the controller and transmit the detected timing difference from the mobile station to the controller upon reception of a report from the controller that the own base station is the reference base station, and the controller is adapted to calculate the difference of timings of down signal transmission from the reference and other base stations from the distance functions thereof and the detected reception timing difference from the mobile station and transmit the calculated transmission timing difference to the other base station, thus causing down signal transmission timing updating. Thus, it is possible to reduce search time and preclude unnecessary signaling in hand-over occasions.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A mobile communication system comprising a plurality of base stations asynchronous to one another, a controller for controlling each of the plurality of base stations and a mobile station for receiving down signals from and transmitting up signals to the plurality of base stations;

the mobile station having a means for detecting the difference of timings of reception of down signals from the plurality of base stations, and a means for transmitting the detected reception timing difference to a reference base station;

the plurality of base stations each having a means for determining a own distance function with respect to the mobile station by detecting a time interval from the timing of down signal transmission till the timing of up signal reception in the mobile station, a means for transmitting the determined own distance function to the controller, and a means for transmitting the detected reception timing difference from the mobile station to the controller upon reception of a report from the controller that the own base station is the reference base station; and the controller having a means for calculating the difference of timings of down signal transmission from the reference and other base stations on the basis of the distance functions thereof and the detected reception timing difference form the mobile station, and a means for transmitting the calculated transmission timing difference to the other in-question base station, thus causing down signal transmission timing updating.

2. The mobile communication system according to claim 1, wherein the mobile station transmits the up signal a predetermined period of time after the pertinent down signal reception timing.

3. The mobile communication system according to claim 1, wherein the plurality of base stations each determine the own distance function in a statistical process with values received from the mobile station in a predetermined constant period of time.

4. The mobile communication system according to claim 1, wherein the plurality of base stations each determine the own distance function in a statistical process with values received from a plurality of mobile stations.

5. The mobile communication system according to claim 1, wherein the plurality of base stations each cause the down signal transmission timing updating within a timing holding capacity of the mobile station.

6. A simplified inter-base station synchronizing methods used for a mobile communication system which comprises a plurality of base stations asynchronous to one another, a controller for controlling each of the plurality of base stations and a mobile station for receiving down signals from and transmitting up signals to the plurality of base stations; wherein the mobile station includes a step for detecting the difference of timings of reception of down signals from the plurality of base stations, and a step for transmitting the detected reception timing difference to a reference base station;

the plurality of base stations each includes a step for determining a own distance function with respect to the mobile station by detecting a time interval from the timing of down signal transmission till the timing of up signal reception in the mobile station, a step for transmitting the determined own distance function to the controller, and a step for transmitting the detected reception timing difference from the mobile station to the controller upon reception of a report from the controller that the own base station is the reference base station; and the controller includes a step for calculating the difference of timings of down signal transmission from the reference and other base stations on the basis of the distance functions thereof and the detected reception timing difference form the mobile station, and a step for transmitting the calculated transmission timing difference to the other in-question base station, thus causing down signal transmission timing updating.

7. The method according to claim 6, wherein the mobile station transmits the up signal a predetermined period of time after the pertinent down signal reception timing.

8. The method according to claim 6, wherein the plurality of base stations each determine the own distance function in a statistical process with values received from the mobile station in a predetermined constant period of time.

9. The method according to claim 6, wherein the plurality of base stations each determine the own distance function in a statistical process with values received from a plurality of mobile stations.

10. The method according to claim 6, wherein the plurality of base stations each cause the down signal transmission timing updating within a timing holding capacity of the mobile station.

11. A mobile communication system in which each of the plurality of base stations asynchronous to one another and a mobile station are controlled for receiving down signals from and transmitting up signals to the plurality of base stations by a controller, wherein the mobile station is adapted to detect the difference of timings of reception of down signals from a reference base station and an other in-question base station among the plurality of base stations and transmit the detected reception timing difference to the reference base station, the plurality of base stations are each adapted to determine a own distance function with respect to the mobile station by detecting a time interval from the timing of down signal transmission from the mobile station till the timing of up signal reception in the mobile station, transmit the determined own distance function to the controller and transmit the detected timing difference from the mobile station to the controller upon reception of a report from the controller that the own base station is the reference base station, and the controller is adapted to calculate the difference of timings of down signal transmission from the reference and other base stations from the distance functions thereof and the detected reception timing difference from the mobile station and transmit the calculated transmission timing difference to the other base station for updating the down signal transmission.

* * * * *